United States Patent [19]
Yokoyama et al.

[11] 4,452,218
[45] Jun. 5, 1984

[54] DUPLEX CARBURETOR AND INTAKE SYSTEM FOR INTERNAL COMBUSTION ENGINES

[75] Inventors: Hiroshi Yokoyama; Tokuzi Ishida, both of Hamamatsu, Japan

[73] Assignee: Suzuki Jidosha Kogyo Kabushiki Kaisha, Kami, Japan

[21] Appl. No.: 338,079

[22] Filed: Jan. 8, 1982

[30] Foreign Application Priority Data

Jun. 24, 1981 [JP] Japan .................................. 56-96735
Jun. 24, 1981 [JP] Japan .................................. 56-96736

[51] Int. Cl.³ ............................................. F02B 13/00
[52] U.S. Cl. .............................. 123/579; 123/59 PC; 123/336; 123/308; 123/342; 261/23 A; 261/41 C
[58] Field of Search .................... 123/579, 590, 59 PC, 123/336, 308, 342; 261/23 A, 41 C

[56] References Cited

U.S. PATENT DOCUMENTS

| | | | |
|---|---|---|---|
| 1,103,931 | 7/1914 | Bennett | 123/590 |
| 1,623,750 | 4/1927 | Pingree | 261/23 A |
| 3,171,395 | 3/1965 | Bartholomew | 261/23 A |
| 3,319,942 | 5/1967 | Mennesson | 261/23 A |
| 3,884,202 | 5/1975 | Sakurai | 123/579 |
| 3,916,860 | 11/1975 | Nakano et al. | 123/579 |
| 3,924,592 | 12/1975 | Miyaki et al. | 123/579 |
| 4,065,920 | 1/1978 | Minami et al. | 123/579 |
| 4,347,816 | 9/1982 | Saito et al. | 123/308 |

FOREIGN PATENT DOCUMENTS 114637 6/1979 Japan .................................. 123/90.15

Primary Examiner—Ira S. Lazarus
Assistant Examiner—E. Rollins Cross
Attorney, Agent, or Firm—Flynn, Thiel, Boutell & Tanis

[57] ABSTRACT

A duplex carburetor for an internal combustion engine has a primary barrel having a primary venturi for supplying an air-fuel mixture to an intake manifold under a full range of engine loads and a secondary barrel having a secondary venturi for supplying an air-fuel mixture to the manifold under higher engine loads. The primary venturi has a cross section which ranges from 20% to 30% of that of the secondary venturi. The secondary barrel has a flattened cross-sectional shape such as of a segment of a circle of an ellipse, and is located adjacent to the primary barrel. The intake manifold is of a duplex construction having primary and secondary common passages connected to the primary and secondary barrels, respectively, of the carburetor. The secondary passage of the manifold has a flattened cross-sectional shape such as of a segment of a circle or an ellipse, and is positioned adjacent to the primary passage. The primary passage extends through a region where the secondary passage is divided into a plurality of secondary branches, and is located immediately in front of the shortest one of the secondary branch. The primary passage is also branched into a plurality of primary branches, the shortest of which is displaced out of axial alignment with a central axis of the intake manifold.

19 Claims, 11 Drawing Figures

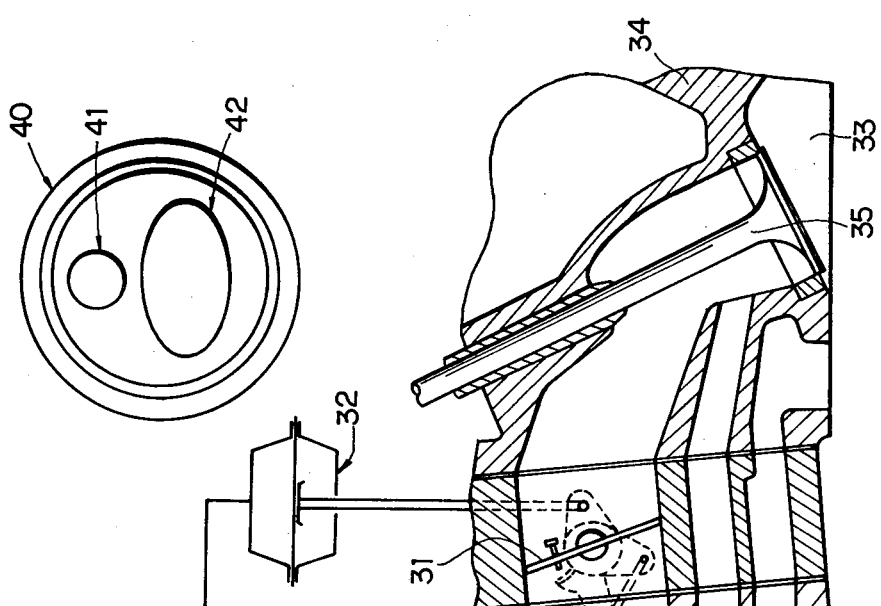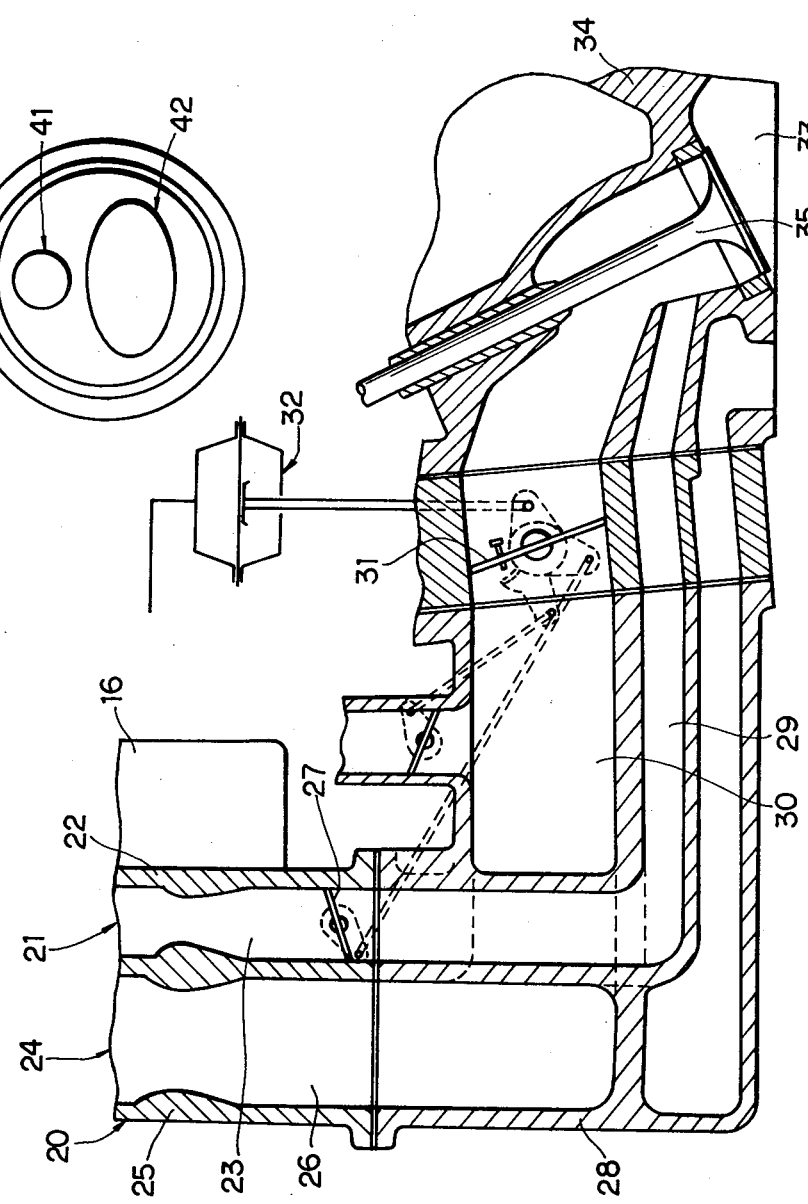

DUPLEX CARBURETOR AND INTAKE SYSTEM FOR INTERNAL COMBUSTION ENGINES

BACKGROUND OF THE INVENTION

1. Field of the Invention

The present invention relates to a duplex carburetor having primary and secondary barrels for supplying air-fuel mixtures under different operating conditions to an internal combustion engine, and an intake manifold for use with such a duplex carburetor.

2. Prior Art

Known duplex or two-barrel carburetors for internal combustion engines include a primary barrel for supplying an air-fuel mixture under a wide range of engine loads and a secondary barrel for supplying an air-fuel mixture under relatively high loads, the primary barrel including a primary venturi smaller in cross-sectional area than a secondary venturi in the secondary barrel. With certain ratios between the cross sections of the primary and secondary venturis, the speed at which an air-fuel mixture flows through the primary barrel becomes reduced as the pressure in the intake manifold is lowered while the secondary barrel is in operation, with the results that the fuel is less atomized than it should be in the primary barrel, and fuel supply at the secondary barrel is retarded, thus failing to provide smooth engine operation.

The primary and secondary barrels have circular cross sections and are spaced relatively widely apart from each other, the secondary barrel being located closer than the primary barrel to the combustion chambers of the engine. The primary barrel is connected to a primary common passage of a duplex intake manifold, which is detoured due to a secondary common passage of the intake manifold communicating with the secondary barrel. Thus, the primary passage is relatively long, presents higher resistance to the flow of an air-fuel mixture, fails to respond promptly to fuel needs, has a larger surface area which is conducive to an increased amount of fuel flow along the wall of the passage, and hence is unable to provide uniform fuel distribution among engine cylinders. As a consequence, combustion in the engine cylinders is rendered unstable for most operating conditions in which the engine usually works, resulting in a lower thermal efficiency of the engine and an increased amount of pollutants in the exhaust gas.

SUMMARY OF THE INVENTION

A duplex carburetor includes a primary barrel having a primary venturi for supplying an air-fuel mixture under a full range of load conditions and a secondary barrel having a secondary venturi for supplying an air-fuel mixture under higher load conditions, the primary venturi having a cross section in the range of from 20% to 30% of that of the secondary venturi. The secondary barrel has a flattened cross-sectional shape such as of a segment of a circle or an ellipse, and is located adjacent to the primary barrel. The primary barrel is disposed on a side of the secondary barrel to which a minor axis thereof is directed, or is located in axial alignment with the minor axis of the secondary barrel. A float chamber is installed in diametrically opposite relation to the secondary barrel across the primary barrel. A duplex intake manifold has primary and secondary common passages connected respectively to the primary and secondary barrels of the carburetor. The secondary passage has a flattened cross-sectional shape such as a segment of a circle or an ellipse, and is located adjacent to the primary passage. The primary passage extends through a region where the secondary passage is divided into a plurality of secondary branches, and is located immediately in front of the shortest one of the secondary branches. The primary passage is divided into a plurality of primary branches, the shortest of which is displaced out of alignment with a central axis of the intake manifold.

It is an object of the present invention to provide a duplex carburetor for internal combustion engines which includes primary and secondary barrels dimensioned for improving combustion of an air-fuel mixture supplied through the primary barrel under low load conditions without impairing operation of the secondary barrels under high load conditions.

Another object of the present invention is to provide a duplex carburetor for internal combustion engines which will enable the engine to operate smoothly throughout a full range of varying load conditions, emit a reduced amount of pollutants such as carbon monoxide and hydrocarbons, and improve thermal efficiency of the engine.

Still another object of the present invention is to provide a duplex carburetor for internal combustion engines, which allows use of relatively short intake manifold passages, can respond promptly to fuel needs, and enables stable fuel combustion in engine cylinders.

Still another object of the present invention is to provide a duplex carburetor for internal combustion engines, which will enable the engine to operate with a leaner air-fuel mixture, and improve fuel economy.

Still another object of the present invention is to provide a duplex intake manifold designed for use with such a duplex carburetor.

Still another object of the present invention is to provide a duplex intake manifold having relatively short intake passages and branches for reduced resistance to the flow of air-fuel mixtures therethrough.

Still another object of the present invention is to provide a duplex intake manifold having intake passages arranged to produce intake pressures in manifold branches proportional to the lengths of the latter for uniform fuel distribution among engine cylinders.

The above and other objects, features and advantages of the present invention will become more apparent from the following description when taken in conjunction with the accompanying drawings in which some preferred embodiments are shown by way of illustrative example.

BRIEF DESCRIPTION OF THE DRAWINGS

FIG. 5 is a fragmentary cross-sectional view taken along line V—V of FIG. 4;

FIG. 6 is a plan view of a modified duplex carburetor;

DETAILED DESCRIPTION OF THE PREFERRED EMBODIMENTS

Figure 1:
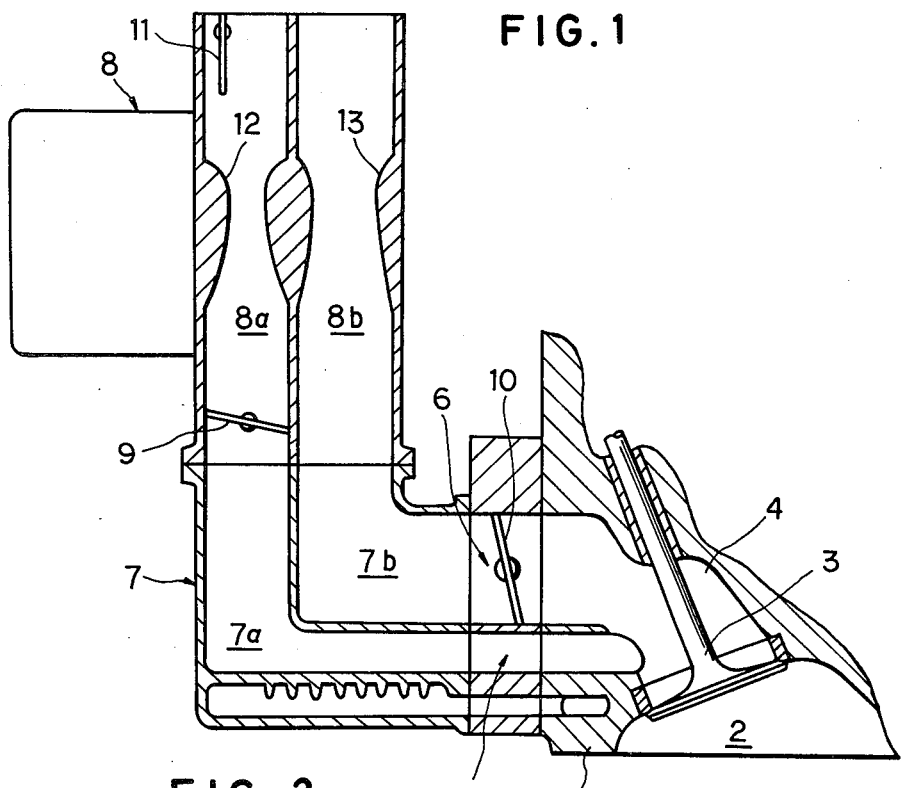
FIG. 1 is a cross-sectional view of a duplex carburetor constructed in accordance with an embodiment of the present invention.

As shown in FIG. 1, an engine cylinder head 1 includes a combustion chamber 2 into which there is opened an inlet port 4 via an intake valve 3. The inlet port 4 communicates with independent primary and secondary passages 5, 6 for supplying air-fuel mixtures into the combustion chamber 2 under a full range of load conditions and higher load conditions, respectively.

An intake manifold 7 is attached to the cylinder head 1 and has a primary intake branch 7a and a secondary intake branch 7b for each engine cylinder. A duplex or two-barrel carburetor 8 is connected to the intake manifold 7 and includes a primary barrel 8a having a primary venturi 12 and communicating with the primary branch 7a of the intake manifold 7 for supplying an air-fuel mixture into the primary branch 7a under most operating conditions of the engine, and a secondary barrel 8b having a secondary venturi 13 and communicating with the secondary branch 7b of the intake manifold 7 for supplying an air-fuel mixture into the secondary branch 7b under engine conditions for acceleration or full power. The primary and secondary barrels 8a, 8b are supplied with air from an air cleaner (not shown). Thus, the primary passage 5 is defined jointly by the primary branch 7a of the intake manifold 7 and the primary barrel 8a of the carburetor 8, and the secondary passage 6 is defined jointly by the secondary branch 7b of the intake manifold 7 and the secondary barrel 8b of the carburetor 8. The primary barrel 8a has therein a throttle valve 9 for opening and closing the barrel 8a. The secondary branch 7b has therein a throttle valve 10 for opening and closing the secondary passage 6. A choke valve 11 is mounted in the primary barrel 8a upstream of the primary venturi 12. The throttle valve 10 is operatively coupled or ganged with the throttle valve 9 through a suitable actuator mechanism (not shown) so that the throttle valve 10 will start to open when the throttle valve 9 is opened through a predetermined angle.

The primary venturi 12 has a cross-sectional flow area therethrough which ranges from 20% to 30% of the cross-sectional flow area of the secondary venturi 13.

The internal combustion engine thus constructed will operate as follows: While the engine is operating under low load conditions, only the throttle valve 9 is opened by a varying degree and the throttle valve 10 remains closed. As the amount of air-fuel mixture supplied is increased under operating conditions for acceleration or full power, there is developed an increased negative pressure at the primary venturi 13, enabling the actuator mechanism to start opening the throttle valve 10. While the engine is operating under higher load conditions, the throttle valve 9 on the primary side is fully open and the throttle valve 10 on the secondary side is relatively wide open, thereby supplying a large amount of air-fuel mixture through the primary and secondary passages 5, 6 into the engine cylinder.

It is known that the ratio between the cross-sectional areas of the primary and secondary venturis 12, 13 greatly affects the rate of fuel consumption and the speed of travel of the air-fuel mixture through the carburetor. More specifically, the rate of fuel consumption of vehicles such as automobiles is generally governed by speeds of travel of the vehicle, resistances to movement of the vehicle, effective generation of the driving power, and the mechanical efficiency of the internal combustion engine. For a better rate of fuel consumption, it is necessary that fuel consumption by the engine be reduced, and the driving power be suitably produced which can overcome resistances to movement of the vehicle.

Figure 2:
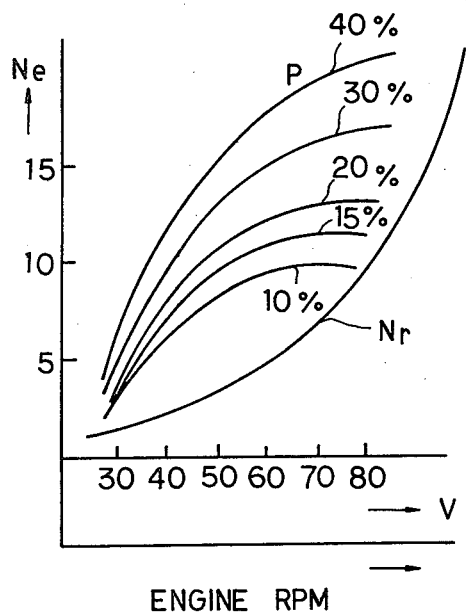
FIG. 2 is a graph showing relationships between speeds of travel and driving horsepowers of automobiles equipped with duplex carburetors having primary and secondary venturis with different ratios between their cross sections.

FIG. 2 shows correlations between the driving horsepower Ne(PS), the vehicle speed V(Km/h), the resistance as expressed by horsepower to travel of the vehicle, and the engine RPM for automobiles having weights ranging from 550 kg to 650 kg and incorporating duplex carburetors having primary and secondary venturis with various cross-sectional ratios P(%). Inspection of FIG. 2 clearly indicates that duplex carburetors with the venturi cross-sectional ratio P of 30% or below optimize the driving horsepower Ne for an improved rate of fuel consumption in a practical range of vehicle speeds V, that is, from 40 to 55 Km/h.

If the ratio P were below 20%, then the primary side would fail to produce an output large enough to generate the required driving horsepower Ne, and the secondary side would come into operation more frequently in the practical range of vehicle speeds. Therefore, fuel economy and drivability would become poorer. If the ratio P were over 30%, the speed of flow of air through the primary venturi would be lowered, and the fuel would be less atomized, with the result that the air-fuel mixture would be supplied at a lower speed failing to produce a swirling motion of the mixture in the combustion chamber. Consequently, the speed of combustion would be reduced, no stable fuel combustion would be achieved, and no smooth drivability would be attained.

Figure 3:
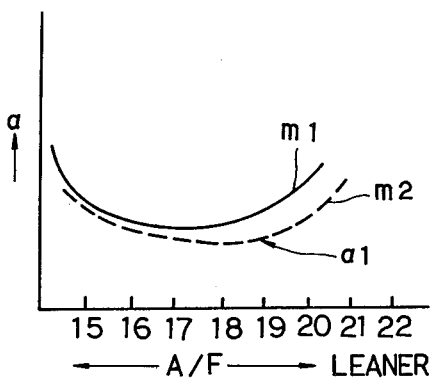
FIG. 3 is a graph illustrative of relationships between air-fuel ratios and rates of fuel consumption of the duplex carburetor according to the present invention and a conventional duplex carburetor.

These difficulties are eliminated by the duplex carburetor 8 with the primary and secondary venturis 12, 13 having the cross-sectional ratio P in the range of from 20% to 30%. FIG. 3 illustrates rates of fuel consumption a (Km/l) against air-fuel ratios A/F. The solid-line curve $m_1$ represents fuel consumption rates of a vehicle having a duplex carburetor with the ratio P in the range of from 35% to 45%, and the broken-line curve $m_2$ represents fuel consumption rates of a vehicle having a duplex carburetor according to the present invention with the ratio P ranging from 20% to 30%. Comparison between the curves $m_1$, $m_2$ shows that the duplex carburetor of the present invention provides a minimum rate of fuel consumption $a_1$ (Km/l) with leaner air-fuel mixtures than those for a minimum rate of fuel consumption obtained by the conventional duplex carburetor. With leaner air-fuel mixtures used, the duplex carburetor of the present invention enables the engine to emit less amounts of pollutants such as carbon monoxide and hydrocarbons, and also allows a higher degree of exhaust gas recirculation (EGR) with a resulting reduction in the amount of nitrogen oxides (NOx) emitted.

Figure 4:
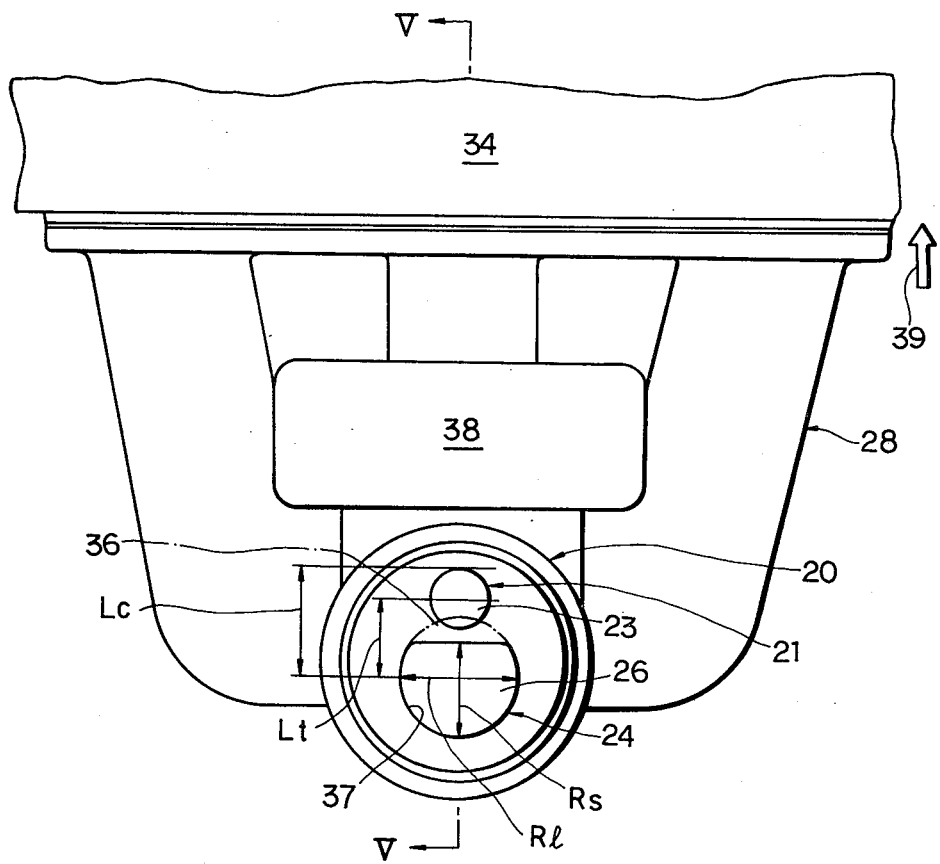
FIG. 4 is a schematic plan view of a duplex carburetor according to another embodiment, the carburetor being shown as associated with an intake manifold.

According to another embodiment shown in FIGS. 4 and 5, a duplex carburetor 20 comprises a primary barrel 21 having a primary venturi 22 and a primary passage 23, and a secondary barrel 24 having a secondary venturi 25 and a secondary passage 26. A throttle valve 27 on the primary side is located in the primary passage 23 downstream of the primary venturi 22. The carburetor 20 is connected at a downstream end thereof to an intake manifold 28 having a primary passage 29 communicating with the primary passage 23 in the primary barrel 21 and a secondary passage 30 communicating with the secondary passage 26 in the secondary barrel 24. A throttle valve 31 on the secondary side is disposed in the secondary passage 30 in the intake manifold 28 and is operatively connected to the throttle valve 27 through a vacuum-operated mechanism 32. The primary and secondary passages 29, 30 are open into a combustion chamber 33 in a cylinder head 34. An air-fuel mixture flowing from the primary and secondary passages 29, 30 is controlled by an intake valve 35 mounted in the cylinder head 34.

As shown in FIG. 4, the secondary barrel 24 has a flattened cross-sectional shape of a segment of a circle, that is, a shape obtained by removing a smaller segment 36 from a circle 37. The flattened cross section of the secondary barrel 24 has a major axis Rl and a minor axis Rs, the former being longer than the latter. The primary barrel 21 is located on a side of the secondary barrel 24 to which the minor axis Rs is directed, or is preferably held in axial alignment with the minor axis Rs. The carburetor 20 also includes a float bowl or chamber 38 disposed adjacent to the primary barrel 21 in diametrically opposite relation to the secondary barrel 24 across the primary barrel 21. The float chamber 38 is disposed forward of the primary barrel 21 in a direction 39 in which a vehicle equipped with the duplex carburetor 20 will move, the cylinder head 34 being located forward of the float chamber 38. With the flattened cross-sectional shape of the secondary barrel 24, the centerlines or axes of the primary and secondary barrels 21, 24 are spaced from each other by a distance Lt much smaller than an interaxial space Lc with a conventional duplex carburetor.

With the arrangement shown in FIGS. 4 and 5, the primary and secondary barrels 21, 24 are located closer to each other than heretofore, and hence the carburetor 20 is smaller in size. Since the primary barrel 21 which will operate in a practical range of vehicle speeds is disposed adjacent to the float chamber 38, the primary barrel 21 can respond promptly to fuel needs for stable fuel combustion in the practical speed range. The secondary barrel 24 is not spaced far apart from the float chamber 38, and hence prevents retarded fuel supply when it comes into operation under higher load conditions, assuring an overall stable fuel combustion and smooth driving operation. Fuel can be added quickly upon acceleration and reduced promptly upon deceleration. With fuel needs thus met quickly, interruptions in fuel supply are prevented during vehicle turns and hence drivability is improved.

As illustrated in FIG. 6, a modified carburetor 40 comprises a primary barrel 41 and a secondary barrel 42, the latter having an elliptical cross-sectional shape. The primary barrel 41 is located substantially in axial alignment with the minor axis of the elliptical cross section of the secondary barrel 42.

Figure 7:
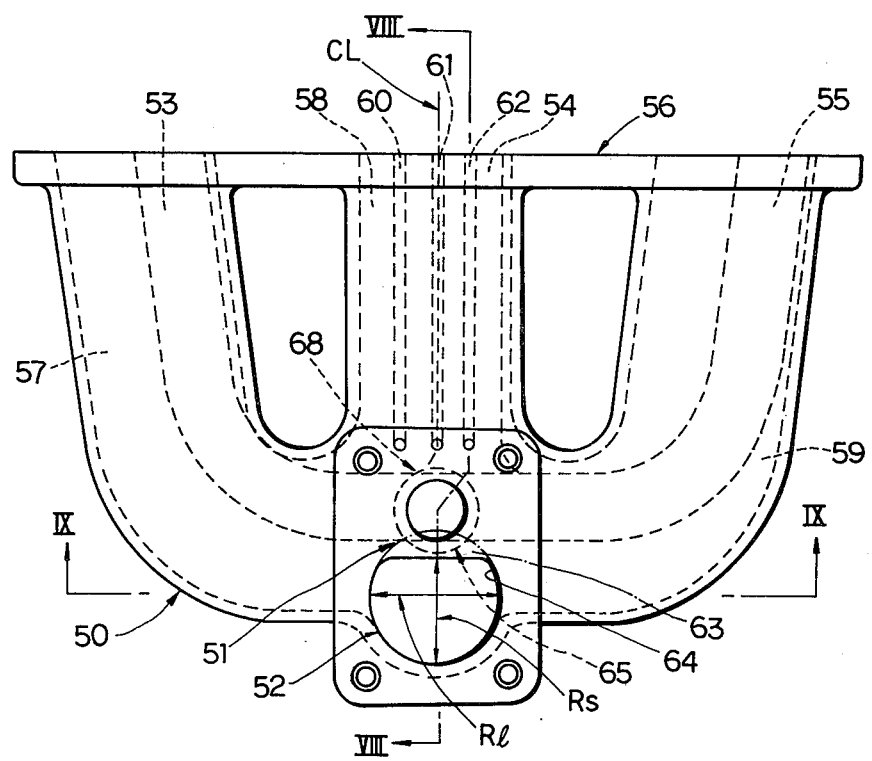
FIG. 7 is a plan view of a duplex intake manifold according to the present invention.
Figure 8:
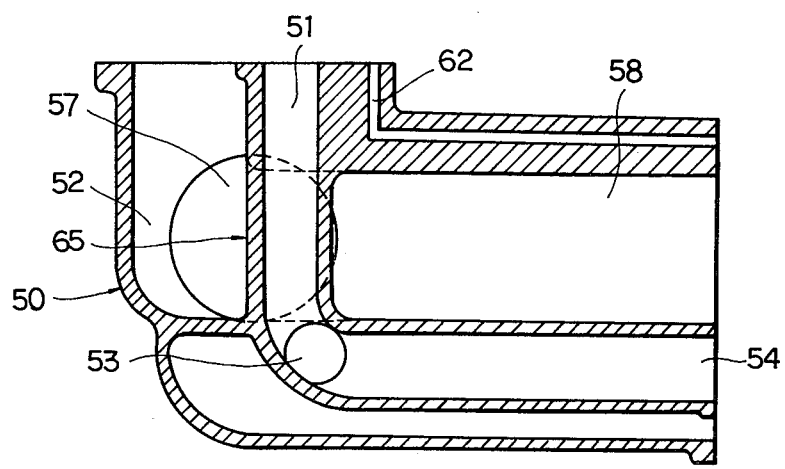
FIG. 8 is a cross-sectional view taken along line VIII—VIII of FIG. 7.

FIGS. 7 and 8 shows a duplex intake manifold 50 according to the present invention which can be connected to the duplex carburetor 20 shown in FIGS. 4 and 5. The intake manifold 50 comprises a primary common passage 51 connectable to the primary barrel 21 (FIG. 5) and a secondary common passage 52 connectable to the secondary barrel 24 (FIG. 5). The primary common passage 51 is divided into a plurality (three in the illustrated embodiment) of primary branches 53, 54, 55 adapted to be coupled respectively to engine cylinders (not shown) through a flange 56 to be attached to a cylinder head (not shown). Likewise, the secondary common passage 52 is divided into a plurality (three in the illustrated embodiment) of secondary branches 57, 58, 59 for being connected respectively to the engine cylinders. The intake manifold 50 also includes a plurality (three in the illustrated embodiment) of secondary low-speed air-fuel mixture passages 60, 61, 62.

As shown in FIG. 7, the secondary common passage 52 has a flattened cross-sectional shape of a segment of a circle, which is obtained by removing a smaller segment 63 from a circle 64. The flattened cross-sectional shape has a major axis Rl and a minor axis Rs, the major axis Rl being larger than the minor axis Rs. The primary common passage 51 is located on a side of the secondary common passage 52 to which the minor axis Rs is directed, or is preferably held in axial alignment with the minor axis Rs, the primary common passage 51 being positioned as closely to the secondary common passage 52, and more closely than the secondary common passage 52 to the flange 56.

Figure 9:
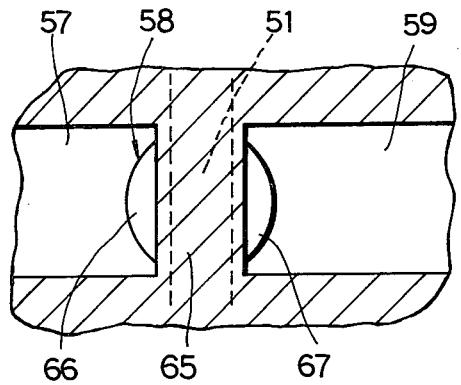
FIG. 9 is a cross-sectional view taken along line IX—IX of FIG. 7.

The primary common passage 51 extends vertically through a region where the secondary common passage 52 is branched into the secondary branches 57, 58, 59, and is located immediately in front of the inlet end of the central or shortest secondary branch 58. The primary common passage 51 thus serves as a baffle 65 for interfering with the flow of an air-fuel mixture coming from the secondary common passage 52 into the secondary branches 57, 58, 59. Thus, the baffle 65 allows suction pressures governing the speed of flow of air-fuel mixtures in the secondary branches 57, 58, 59 to be proportional to the lengths of the latter for uniform fuel distribution among the engine cylinders. As illustrated in FIG. 9, the primary common passage 51 located in front of the central secondary branch 58 divides the opening of the latter into a pair of first and second openings 66, 67 which are dimensioned to have cross-sectional areas larger than the cross-sectional area of the secondary common passage 52, thereby preventing increased resistance to the flow of the air-fuel mixture into the central secondary branch 58.

As shown in FIG. 7, the central or shortest primary branch 54 is displaced sidewardly from central plane CL of the manifold 50 (which plane CL passes through the centerlines of passages 51, 52 and branch 58) to define a control wall or baffle 68 for the purpose of reducing the speed of flow of an air-fuel mixture through the shortest primary passage 54. Thus, fuel distribution among the primary branches 53, 54, 55 is uniformized.

Under low and medium load conditions, an air-fuel mixture flows only through the primary common passage 51 and the primary branches 53–55. With the primary common passage 51 being closer to the flange 56, the length of the passage 51 is reduced for good response to fuel needs, and the inner surface area thereof is smaller with a reduction in the amount of fuel flowing along the inner wall of the passage 51. The distribution control wall 68 serves to distribute fuel uniformly among the engine cylinders for attaining an improved thermal efficiency and reducing pollutants in the exhaust gas.

While the engine is operating under high load conditions, the secondary common passage 52 comes into operation for supplying an air-fuel mixture into the secondary branches 57–59. Since the air-fuel mixture flows into the shortest secondary branch 58 around the baffle 65 through the first and second openings 66, 67, the speed of flow and the amount of supply of the air-fuel mixture in the secondary branch 58 are reduced to the point where uniform fuel distribution is attained among the secondary branches 57–59. Fuel distribution is also uniformized by the flattened cross-sectional shape of the secondary common passage 52 with the secondary branches 57, 58 being substantially aligned with the major axis Rl.

Figure 11:
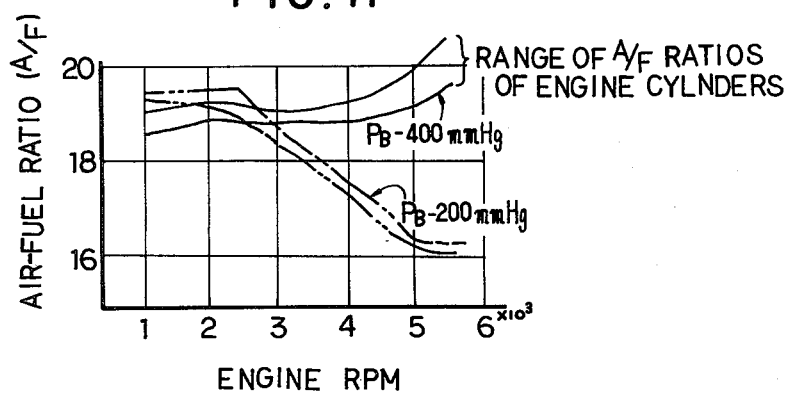
FIG. 11 is a graph showing ranges of air-fuel ratios as plotted against engine RPM.

FIG. 11 shows ranges of air-fuel ratios of engine cylinders equipped with the intake manifold according to the present invention, the horizontal axis being indicative of engine RPM and the vertical axis of air-fuel ratios. A range of air-fuel ratios obtained when the negative pressure in the intake pipe is −200 mmHg is shown by the two-dot-and-dash lines, and a range of air-fuel ratios obtained when the negative pressure is −400 mmHg is indicated by the solid lines. Inspection of the ranges shows that the maximum range of A/F ratios is within about 0.5. The duplex intake manifold according to the present invention can supply engine cylinders with an air-fuel mixture having an ideal air-fuel ratio without causing much fuel flow along the inner walls of the common passages and branches of the manifold.

The secondary low-speed passages 60, 61, 62 are provided independently respectively for and disposed closely to the engine cylinders for better crossover characteristics and improved acceleration performance.

Figure 10:
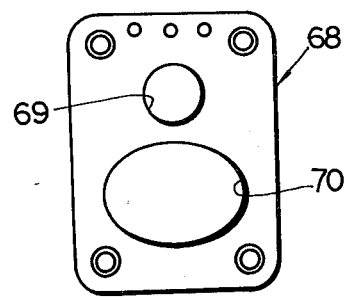
FIG. 10 is a plan view of a modified duplex intake manifold.

As shown in FIG. 10, a modified duplex intake manifold 68 has a primary common passage 69 and a secondary common passage 70 which is of an elliptical cross section with the primary common passage 69 disposed substantially in alignment with the minor axis of the elliptical cross section of the secondary common passage 70.

Although certain preferred embodiments have been shown and described in detail, it should be understood that various changes and modifications may be made therein without departing from the scope of appended claims. For example, the present invention is applicable to internal combustion engines having a plurality of cylinders other than three cylinders.

What is claimed is:

1. A duplex carburetor for use with an intake manifold having a pair of common inlet passages for an internal combustion engine, said duplex carburetor comprising:
a primary barrel adapted to be connected to one of the inlet passages of the intake manifold for supplying an air-fuel mixture thereinto under a full range of load conditions of the engine;
a secondary barrel adapted to be connected to the other inlet passages of the intake manifold for supplying an air-fuel mixture thereinto under higher load conditions;
said secondary barrel having a flattened cross-sectional shape defining perpendicular major and minor axes, said cross-sectional shape having a dimension along said major axis which is larger than the dimension along said minor axis; and
said primary and secondary barrels being located adjacent each other with said primary barrel being positioned adjacent a side of said secondary barrel, which said side is intersected by said minor axis.

2. A duplex carburetor according to claim 1, wherein said primary barrel is positioned in axial alignment with said minor axis of the secondary barrel so that said minor axis intersects the longitudinal axis of said primary barrel.

3. A duplex carburetor according to claim 1, said cross-sectional shape of said secondary barrel comprising a segment of a circle.

4. A duplex carburetor according to claim 1, said cross-sectional shape of said secondary barrel comprising an ellipse.

5. A duplex carburetor according to claim 2, wherein the cross-sectional shape of said secondary barrel comprises a segment of a circle having a profile which includes an arcuate line joined together by a straight line, said arcuate line being less than a full circle but greater than a semicircle, and said straight line extending between the ends of said arcuate line, said minor axis being disposed in perpendicular and intersecting relationship with said straight line, and said primary barrel being positioned closely adjacent said straight line so that said primary barrel is intersected by an imaginary line generated by extending said arcuate line through a full circle.

6. A duplex carburetor for use with an intake manifold having a pair of common inlet passages for an internal combustion engine of a vehicle, said duplex carburetor comprising:
a primary barrel adapted to be connected to one of the inlet passages of the intake manifold for supplying an air-fuel mixture thereinto under a full range of load conditions of the engine;
a secondary barrel adapted to be connected to the other inlet passage of the intake manifold for supplying an air-fuel mixture thereinto under higher load conditions;
said secondary barrel having a flattened cross-sectional shape defining perpendicular major and minor axes, said cross-sectional shape having a dimension along said major axis which is larger than the dimension along said minor axis;
said primary and secondary barrels being located adjacent each other with said primary barrel being positioned adjacent a side of said secondary barrel, which said side is intersected by said minor axis; and
a float chamber located adjacent a side of said primary barrel, said float chamber and said secondary barrel being disposed adjacent diametrically opposite sides of said primary barrel, and said float chamber being disposed adjacent the forward side of the said primary barrel relative to the forward direction of movement of the vehicle.

7. A duplex carburetor according to claim 6, wherein said primary barrel is positioned closely adjacent said side of said secondary barrel such that said minor axis intersects the longitudinal axis of said primary barrel.

8. A duplex carburetor according to claim 7, wherein the cross-sectional shape of said secondary barrel comprises a segment of a circle having a profile which includes an arcuate line joined together by a straight line, said arcuate line being less than a full circle but greater than a semicircle, and said straight line extending between the ends of said arcuate line, said minor axis being disposed in perpendicular and intersecting relationship with said straight line, and said primary barrel being positioned closely adjacent said straight line so that said primary barrel is intersected by an imaginary line generated by extending said arcuate line through a full circle.

9. A duplex carburetor according to claim 7, wherein the cross-sectional shape of said secondary barrel comprises an ellipse which is elongated along said major axis, said primary barrel having a circular cross-sectional shape positioned closely adjacent said secondary barrel.

10. A duplex intake manifold for use with a duplex carburetor having primary and secondary barrels for a multiple cylinder internal combustion engine, comprising:

a primary common passage adapted to be connected to the primary barrel of the duplex carburetor for supplying an air-fuel mixture under a full range of load conditions of the engine;

a secondary common passage adapted to be connected to the secondary barrel of the duplex carburetor for supplying an air-fuel mixture under higher load conditions;

said secondary common passage having a flattened cross-sectional shape having a major axis larger than a minor axis thereof, said primary and secondary common passages being located adjacent each other with said primary common passage being positioned adjacent a side of said secondary common passage which is intersected by said minor axis;

a plurality of secondary branch passages each having an inlet end thereof connected to said secondary common passage and the other end thereof connectible to a respective one of the cylinders, at least one of said secondary branch passages being shorter than others of the secondary branch passes; and said primary common passage extending directly through a region where said secondary common passage connects to said plurality of secondary branch passages so that a portion of said primary common passage is located immediately in front of the inlet end of said one secondary branch passage to restrict the flow into said one secondary branch passage so that a more uniform flow occurs through all of the secondary branch passages.

11. A duplex intake manifold according to claim 10, said primary passage being axially aligned with said minor axis of the secondary passage.

12. A duplex intake manifold according to claim 10, said cross-sectional shape of said secondary barrel comprising a segment of a circle.

13. A duplex intake manifold according to claim 10, said cross-sectional shape of said secondary barrel comprising an ellipse.

14. A duplex intake manifold according to claim 10, including a plurality of primary branch passages each having an inlet at one end thereof which communicates with said primary common passage and an outlet at the other end thereof connectible to a respective one of the cylinders, the inlet ends of said primary branch passages communicating with said primary common passage at an intersection region, one of said primary branch passages being shorter than others of the primary branch passages, and said one primary branch passage at the inlet end thereof where it connects to said primary common passage being sidewardly displaced so that the centerlines of said one primary branch passage and said primary common passage do not intersect, the sideward displacement being effected by a control wall disposed adjacent the inlet end of said one primary branch passage for restricting flow into and through said one primary branch passage so as to achieve more uniform flow through all of the primary branch passages.

15. A duplex intake manifold according to claim 10, wherein said primary and secondary common passages have the longitudinal centerlines thereof extending transversely with respect to a plane which contains said plurality of secondary branch passages, said plurality of branch passages including at least two branch passages which are longer than and are positioned on opposite sides of said one branch passage, all of said branch passages communicating with said secondary common passage substantially at said region, said primary common passage interfering solely with the inlet end of said one branch passage.

16. A duplex intake manifold according to claim 15, wherein said primary common passage is defined within a tubular wall structure which extends through said region across the inlet end of said one secondary branch passage, said tubular wall structure being positioned so as to extend centrally across the inlet end of said one branch passage so as to define a pair of reduced-area openings which are disposed on opposite sides of said tubular wall structure so as to permit communication with said one secondary branch passage.

17. A duplex intake manifold according to claim 16, including a plurality of primary branch passages each having an inlet at one end thereof which communicates with said primary common passage and an outlet at the other end thereof connectible to a respective one of the cylinders, the inlet ends of said primary branch passages communicating with said primary common passage at an intersection region, one of said primary branch passages being shorter than others of the primary branch passages, and said one primary branch passage at the inlet end thereof where it connects to said primary common passage being sidewardly displaced so that the centerlines of said one primary branch passage and said primary common passage do not intersect, the sideward displacement being effected by a control wall disposed adjacent the inlet end of said one primary branch passage for restricting flow into and through said one primary branch passage so as to achieve more uniform flow through all of the primary branch passages; and said plurality of primary branch passages including at least two said primary branch passages which are identical and disposed on opposite sides of said one primary branch passage, said two primary branch passages being symmetrically disposed with respect to a plane which passes through the central axis of said primary common passage and extends parallel to the longitudinal axis of said one primary branch passage, said one primary branch passage being sidewardly displaced relative to said plane.

18. A duplex intake manifold for use with a duplex carburetor having primary and secondary barrels for a multiple cylinder internal combustion engine, comprising:

a primary common passage adapted to be connected to the primary barrel of the duplex carburetor for supplying an air-fuel mixture under a full range of load conditions of the engine;

a secondary common passage adapted to be connected to the secondary barrel of the duplex carburetor for supplying an air-fuel mixture under higher load conditions;

said secondary common passage having a flattened cross-sectional shape having a major axis larger than a minor axis thereof, said primary and secondary common passages being located adjacent each other with said primary passage being positioned adjacent a side of said secondary common passage which is intersected by said minor axis;

a plurality of primary branch passages each having an inlet at one end thereof which communicates with said primary common passage and an outlet at the other end thereof connectible to a respective one of the cylinders, the inlet ends of said primary branch passages communicating with said primary common passage at an intersection region, one of said primary branch passages being shorter than others of the primary branch passages, and said one primary branch passage at the inlet end thereof where it connects to said primary common passage being sidewardly displaced so that the centerlines of said one primary branch passage and said primary common passage do not intersect, the sideward displacement being effected by a control wall disposed adjacent the inlet end of said one primary branch passage for restricting flow into and through said one primary branch passage so as to achieve more uniform flow through all of the primary branch passages.

19. A duplex intake manifold according to claim 18, wherein said plurality of primary branch passages includes only three said passages with two of said primary branch passages being identical and disposed on opposite sides of said one primary branch passage, said two primary branch passages being symmetrically disposed with respect to a plane which passes through the central axis of said primary common passage and extends parallel to the longitudinal axis of said one primary branch passage, said one primary branch passage being sidewardly displaced relative to said plane.

* * * * *

UNITED STATES PATENT AND TRADEMARK OFFICE
CERTIFICATE OF CORRECTION

PATENT NO. : 4 452 218
DATED : June 5, 1984
INVENTOR(S) : Hiroshi Yokoyama and Tokuzi Ishida It is certified that error appears in the above-identified patent and that said Letters Patent is hereby corrected as shown below:

Col. 9, line 38; change "passes" to ---passages---.

Signed and Sealed this

Eighth Day of January 1985

[SEAL]

*Attest:*

*Attesting Officer*

GERALD J. MOSSINGHOFF

*Commissioner of Patents and Trademarks*